United States Patent
Lu et al.

(10) Patent No.: US 11,259,277 B2
(45) Date of Patent: Feb. 22, 2022

(54) DATA SENDING AND RECEIVING METHOD AND APPARATUS TO IMPROVE RELIABILITY OF DATA TRANSMISSION IN A V2X COMMUNICATIONS SYSTEM

(71) Applicant: HUAWEI TECHNOLOGIES CO., LTD., Shenzhen (CN)

(72) Inventors: Zhenwei Lu, Beijing (CN); Deping Liu, Beijing (CN); Yi Shi, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 93 days.

(21) Appl. No.: 16/786,955

(22) Filed: Feb. 10, 2020

(65) Prior Publication Data
US 2020/0178218 A1    Jun. 4, 2020

Related U.S. Application Data

(63) Continuation of application No. PCT/CN2017/097239, filed on Aug. 11, 2017.

(51) Int. Cl.
*H04L 12/28* (2006.01)
*H04W 72/02* (2009.01)
(Continued)

(52) U.S. Cl.
CPC ............. *H04W 72/02* (2013.01); *H04W 4/40* (2018.02); *H04W 72/0446* (2013.01);
(Continued)

(58) Field of Classification Search
CPC ... H04W 4/40; H04W 72/02; H04W 72/0406; H04W 72/0453; H04W 72/04; H04W 76/14; H04L 5/001
(Continued)

(56) References Cited

U.S. PATENT DOCUMENTS

2012/0269140 A1   10/2012   Nam et al.
2016/0197781 A1   7/2016    Smith
(Continued)

FOREIGN PATENT DOCUMENTS

CN    101043485 A    9/2007
CN    101345970 A    1/2009
(Continued)

OTHER PUBLICATIONS

Ericsson,"Contents of Downlink Control Information for V2V over PC5",3GPP TSG RAN WG1 Meeting #85 R1-165246,Nanjing, PRC, May 23-27, 2016,total 3 pages.
(Continued)

*Primary Examiner* — John Pezzlo
(74) *Attorney, Agent, or Firm* — Hauptman Ham, LLP

(57) ABSTRACT

The present disclosure provides a data sending method. A first terminal device, determines at least two carriers to transmit at least two pieces of data corresponding to a same transport block, and in a one-to-one correspondence with the at least two pieces of data. The at least two pieces of data can be sent by the first terminal to a second terminal device or a network device by using the at least two carriers. When the first terminal device sends data, the first terminal device may send the at least two pieces of data to the second terminal device or the network device on the at least two carriers to improve reliability of data transmission. The at least two pieces of data may be sent simultaneously, to avoid an increased latency by transmissions of the at least two pieces of data in different time units.

16 Claims, 8 Drawing Sheets

200

A network device generates first information, where the first information is used to indicate at least two carriers, the first information is used to indicate that at least two pieces of data corresponding to a same transport block are transmitted on the at least two carriers, and the at least two carriers are in a one-to-one correspondence with the at least two pieces of data — S201

The network device sends the first information to a first terminal device — S202

(51) Int. Cl.
*H04W 4/40* (2018.01)
*H04W 76/27* (2018.01)
*H04W 72/04* (2009.01)
*H04J 1/16* (2006.01)
*H04W 92/18* (2009.01)

(52) U.S. Cl.
CPC ....... *H04W 72/0453* (2013.01); *H04W 76/27* (2018.02); *H04W 92/18* (2013.01)

(58) Field of Classification Search
USPC .......................................... 370/252, 329, 430
See application file for complete search history.

(56) References Cited

U.S. PATENT DOCUMENTS

| | | | |
|---|---|---|---|
| 2017/0126306 A1* | 5/2017 | Kim | H04B 7/15507 |
| 2018/0263052 A1 | 9/2018 | Xu et al. | |
| 2020/0068534 A1* | 2/2020 | Li | H04L 5/0044 |
| 2020/0106557 A1* | 4/2020 | Wong | H04L 1/08 |
| 2020/0195389 A1* | 6/2020 | Basu Mallick | H04W 72/02 |

FOREIGN PATENT DOCUMENTS

| | | |
|---|---|---|
| CN | 101615992 A | 12/2009 |
| CN | 102006623 A | 4/2011 |
| CN | 106559877 A | 4/2017 |
| KR | 101186619 B1 | 9/2012 |

OTHER PUBLICATIONS

Ericsson,"Contents of Downlink Control Information for V2V over PC5",3GPP TSG RAN WG1 Meeting #86 R1-166957,Gothenburg, Sweden, Aug. 22-26, 2016,total 3 pages.
LG Electronics,"Remaining issues for PC5 V2V",3GPP TSG RAN WG1 Meeting #88 R1-1702394, Athens, Greece Feb. 13-17, 2017,total 6 pages.
Intel Corporation,"Sidelink carrier aggregation for LTE V2V communication", 3GPP TSG RAN WG1 Meeting #89 R1-1707300,Hangzhou, P.R. China May 15-19, 2017,total 8 pages.
CATT,"Discussion on carrier aggregation in V2X Phase 2",3GPP TSG RAN WG1 Meeting #89 R1-1707447,Hangzhou, China, May 15-19, 2017,total 5 pages.
Indian Office Action issued in corresponding Indian Patent Application No. 201937042689, dated Jan. 27, 2021, pp. 1-6, Intellectual Property of India, Kolkata, India.

* cited by examiner

DCI 1 | CIF=1 CIF=2

DCI 2 | CIF=2 CIF=1

FIG. 3

DCI 1 | CIF=1 CIF=2

DCI 2 | CIF=2 CIF=3

DCI 3 | CIF=3 CIF=1

```
┌─────────────────────────────────────────────────┐
│ A first terminal device determines at least two │
│ carriers, where the at least two carriers are   │
│ used to transmit at least two pieces of data    │──── S901
│ corresponding to a same transport block, and    │
│ the at least two carriers are in a one-to-one   │
│ correspondence with the at least two pieces     │
│ of data                                         │
└─────────────────────────────────────────────────┘
                        │
┌─────────────────────────────────────────────────┐
│ The first terminal device sends the at least    │
│ two pieces of data to a second terminal device  │──── S902
│ or a network device by using the at least two   │
│ carriers                                        │
└─────────────────────────────────────────────────┘
```

```
┌─────────────────────────────────────────────────┐
│ A second terminal device receives second        │
│ information from a first terminal device,       │
│ where the second information is used to         │
│ indicate at least two carriers, the second      │
│ information is used to indicate that at least   │──── S1001
│ two pieces of data corresponding to a same      │
│ transport block are transmitted on the at least │
│ two carriers, and the at least two carriers are │
│ in a one-to-one correspondence with the at      │
│ least two pieces of data                        │
└─────────────────────────────────────────────────┘
                        │
┌─────────────────────────────────────────────────┐
│ The second terminal device receives the at      │
│ least two pieces of data from the first         │──── S1002
│ terminal device by using the at least two       │
│ carriers                                        │
└─────────────────────────────────────────────────┘
```

FIG. 10

DATA SENDING AND RECEIVING METHOD AND APPARATUS TO IMPROVE RELIABILITY OF DATA TRANSMISSION IN A V2X COMMUNICATIONS SYSTEM

CROSS-REFERENCE TO RELATED APPLICATIONS

The present disclosure is a continuation of International Application No. PCT/CN2017/097239, filed on Aug. 11, 2017, the disclosure of which is hereby incorporated by reference in its entirety.

TECHNICAL FIELD

The present disclosure relates to the field of wireless communications, and in particular, to a data sending and receiving method and an apparatus.

BACKGROUND

Vehicle-to-everything (vehicle to X, V2X) communication is an important technology for implementing self-driving. The V2X communication includes vehicle-to-vehicle (vehicle to vehicle, V2V) communication, vehicle-to-pedestrian (vehicle to pedestrian, V2P) communication, and vehicle-to-infrastructure/network (vehicle to infrastructure/network, V2I/N) communication. In an application scenario of V2X communication, for example, a vehicle may communicate with another vehicle or infrastructure by using a wireless network, to obtain a series of traffic information such as a real-time road condition, road information, and pedestrian information. The vehicle needs to process the obtained traffic information, classify the information based on a priority, and warn of a possible dangerous situation, so as to avoid a risk.

If the vehicle fails to receive the traffic information, or a latency of receiving the traffic information by the vehicle is relatively high, a risk warning failure may be caused, and consequently, a vehicle accident occurs. Therefore, a reliability requirement and a latency requirement of the V2X communication for data transmission are both relatively high. An existing communication method cannot meet the reliability requirement and the latency requirement of the V2X communication for data transmission.

SUMMARY

The present disclosure provides a data sending and receiving method and an apparatus, and an information sending method and apparatus, to improve reliability of data transmission in a V2X communications system, and reduce data transmission latency.

According to a first aspect, an information sending method is provided, including: generating, by a network device, first information, where the first information is used to indicate at least two carriers, the first information is used to indicate that at least two pieces of data corresponding to a same transport block are transmitted on the at least two carriers, and the at least two carriers are in a one-to-one correspondence with the at least two pieces of data; and sending, by the network device, the first information to a first terminal device.

According to the information sending method provided in this embodiment, the first terminal device may send the at least two pieces of data to a second terminal device or the network device on the at least two carriers indicated by the network device, where the at least two pieces of data correspond to the same transport block, so as to improve reliability of data transmission; and the at least two pieces of data may be sent simultaneously, so that an increased latency caused by a plurality of transmissions of the at least two pieces of data in different time units is avoided.

In one embodiment, the first information includes at least two pieces of first identification information, and the at least two pieces of first identification information are used to indicate the at least two carriers.

The first identification information may be, for example, a carrier indicator field (carrier indicator field, CIF). The network device may send a plurality of pieces of first information to the first terminal device. Each piece of first information may include a CIF of another carrier in addition to a CIF of a carrier used by the first information. Therefore, the first terminal device may determine the at least two carriers based on the CIF. The solution is easy to implement.

In one embodiment, the first information includes at least two pieces of indication information, any one of the at least two pieces of indication information includes one piece of first identification information and one piece of second identification information, the one piece of first identification information is used to indicate one of at least two carriers, the second identification information in the at least two pieces of indication information is the same, and the second identification information in the at least two pieces of indication information is used to indicate that the at least two pieces of data corresponding to the same transport block are transmitted on the at least two carriers.

In this embodiment, carriers that have the same second identification information are used to transmit data corresponding to a same transport block. Therefore, the network device needs to add only one piece of second identification information to schedule the first terminal device to simultaneously transmit data corresponding to a plurality of transport blocks. The solution is easy to implement.

In one embodiment, the first information includes one piece of first identification information, and the one piece of first identification information is used to indicate the at least two carriers.

In a communications system, identification information of the at least two carriers may be pre-configured as the first identification information; and the network device needs to receive only one piece of first identification information to schedule the first terminal device to transmit the at least two pieces of data by using the at least two carriers. In this way, signaling overheads are reduced.

In one embodiment, before the network device sends the first information to the first terminal device, the method further includes: sending, by the network device, first configuration information and second configuration information to the first terminal device, where the first configuration information is used to configure identification information of the at least two carriers as the first identification information, and the second configuration information is used to configure time-frequency resource pools corresponding to the at least two carriers.

The network device configures the identification information of the at least two carriers and the time-frequency resource pools of the at least two carriers by using the configuration information, so as to flexibly schedule the first terminal device to transmit the at least two pieces of data by using the at least two carriers.

In one embodiment, the first configuration information is carried in a broadcast message or a radio resource control (radio resource control, RRC) dedicated message; and the second configuration information is carried in the broadcast message or the RRC dedicated message.

The network device may configure at least two carriers by using the broadcast message. When sending data to the second terminal device by using the at least two carriers, the first terminal device does not need to indicate to the second terminal device that data corresponding to a same transport block is transmitted on the at least two carriers, so that signaling overheads are reduced.

In one embodiment, the first information includes one piece of first identification information, and the one piece of first identification information is used to indicate one of the at least two carriers.

In the communications system, an association relationship between the identification information of the at least two carriers may be pre-configured. The association relationship is used to indicate that the at least two pieces of data corresponding to the same transport block are transmitted on the at least two carriers. The network device needs to send only one piece of first identification information to schedule the first terminal device to transmit the at least two pieces of data by using the at least two carriers, so that signaling overheads are reduced.

In one embodiment, before the network device sends the first information to the first terminal device, the method further includes: sending, by the network device, second configuration information and third configuration information to the first terminal device, where the second configuration information is used to configure time-frequency resource pools corresponding to the at least two carriers, the third configuration information is used to configure an association relationship, and the association relationship is used to indicate that the at least two pieces of data corresponding to the same transport block are transmitted on the at least two carriers.

The network device configures the time-frequency resource pools of the at least two carriers and the association relationship between the identification information of the at least two carriers by using the configuration information, so as to flexibly schedule the first terminal device to transmit the at least two pieces of data by using the at least two carriers.

In one embodiment, the second configuration information is carried in a broadcast message or an RRC dedicated message, and the third configuration information is carried in the broadcast message or the RRC dedicated message.

The network device may configure at least two carriers by using the broadcast message. When sending data to the second terminal device by using the at least two carriers, the first terminal device does not need to indicate to the second terminal device that data corresponding to a same transport block is transmitted on the at least two carriers, so that signaling overheads are reduced.

According to a second aspect, a data sending method is provided, including: determining, by a first terminal device, at least two carriers, where the at least two carriers are used to transmit at least two pieces of data corresponding to a same transport block, and the at least two carriers are in a one-to-one correspondence with the at least two pieces of data; and sending, by the first terminal device, the at least two pieces of data to a second terminal device or a network device by using the at least two carriers.

According to the data sending method provided in this embodiment, the first terminal device may send the at least two pieces of data to the second terminal device or the network device on the at least two carriers, where the at least two pieces of data correspond to the same transport block, so as to improve reliability of data transmission; and the at least two pieces of data may be sent simultaneously, so that an increased latency caused by a plurality of transmissions of the at least two pieces of data in different time units is avoided.

In one embodiment, the determining, by a first terminal device, at least two carriers includes: receiving, by the first terminal device, first information from the network device, where the first information is used to indicate the at least two carriers, and the first information is used to indicate that the at least two pieces of data corresponding to the same transport block are transmitted on the at least two carriers; and determining, by the first terminal device, the at least two carriers based on the first information.

The first terminal device may determine the at least two carriers based on the first information sent by the network device, so as to flexibly determine the at least two carriers.

In one embodiment, the first information includes at least two pieces of first identification information, and the at least two pieces of first identification information are used to indicate the at least two carriers.

The first identification information may be, for example, a CIF. The network device may send a plurality of pieces of first information to the first terminal device. Each piece of first information may include a CIF of another carrier in addition to a CIF of a carrier used by the first information. Therefore, the first terminal device may flexibly determine the at least two carriers.

In one embodiment, the first information includes at least two pieces of indication information, any one of the at least two pieces of indication information includes one piece of first identification information and one piece of second identification information, the one piece of first identification information is used to indicate one of at least two carriers, the second identification information in the at least two pieces of indication information is the same, and the second identification information in the at least two pieces of indication information is used to indicate that the at least two pieces of data corresponding to the same transport block are transmitted on the at least two carriers.

In this embodiment, carriers that have the same second identification information are used to transmit data corresponding to a same transport block. Therefore, the network device needs to add only a plurality of pieces of second identification information to schedule the first terminal device to simultaneously transmit data corresponding to a plurality of transport blocks, so that signaling overheads are reduced. The solution is easy to implement.

In one embodiment, the first information includes one piece of first identification information, and the first identification information is used to indicate the at least two carriers.

In a communications system, identification information of the at least two carriers may be pre-configured as the first identification information. The first terminal device needs to receive only one piece of first identification information, to determine to transmit the at least two pieces of data by using the at least two carriers. In this way, signaling overheads are reduced.

In one embodiment, before the first terminal device receives the first information from the network device, the method further includes: receiving, by the first terminal device, first configuration information and second configuration information from the network device, where the first configuration information is used to configure identification information of the at least two carriers as the first identification information, and the second configuration information is used to configure time-frequency resource pools corresponding to the at least two carriers.

The network device configures the identification information of the at least two carriers and the time-frequency resource pools of the at least two carriers by using the configuration information, so as to flexibly schedule the first terminal device to transmit the at least two pieces of data by using the at least two carriers.

In one embodiment, the first information includes one piece of first identification information, and the one piece of first identification information is used to indicate one of the at least two carriers.

In the communications system, an association relationship between the identification information of the at least two carriers may be pre-configured. The association relationship is used to indicate that the at least two pieces of data corresponding to the same transport block are transmitted on the at least two carriers. The first terminal device needs to receive only one piece of first identification information to determine that the at least two pieces of data are transmitted by using the at least two carriers, so that signaling overheads are reduced.

In one embodiment, before the first terminal device receives the first information from the network device, the method further includes: receiving, by the first terminal device, second configuration information and third configuration information from the network device, where the second configuration information is used to configure time-frequency resource pools corresponding to the at least two carriers, the third configuration information is used to configure an association relationship, and the association relationship is used to indicate that the at least two pieces of data corresponding to the same transport block are transmitted on the at least two carriers.

The network device configures the time-frequency resource pools of the at least two carriers and the association relationship between the identification information of the at least two carriers by using the configuration information, so as to flexibly schedule the first terminal device to transmit the at least two pieces of data by using the at least two carriers.

In one embodiment, the method further includes: sending, by the first terminal device, second information to the second terminal device, where the second information is used to indicate that the at least two pieces of data corresponding to the same transport block are transmitted on the at least two carriers.

According to the data sending method provided in this embodiment, the first terminal device sends the second information to the second terminal device, where the second information indicates that the at least two pieces of data corresponding to the same transport block are transmitted on the at least two carriers, and sends the at least two pieces of data to the second terminal device on the at least two carriers, so as to improve reliability of data transmission; and the at least two pieces of data may be sent simultaneously, so that an increased latency caused by a plurality of transmissions of the at least two pieces of data in different time units is avoided.

In one embodiment, the sending, by the first terminal device, second information to the second terminal device includes: sending, by the first terminal device, the second information to the second terminal device by using a first carrier, where the first carrier is one of the at least two carriers, the second information includes at least one piece of first identification information, the at least one piece of first identification information is used to indicate a second carrier, and the second carrier is at least one carrier in the at least two carriers other than the first carrier.

The first terminal device may send a plurality of pieces of second information to the second terminal device, where each piece of second information includes at least one piece of first identification information used to indicate the second carrier, and there is no need to indicate the first carrier, thereby reducing signaling overheads.

According to a third aspect, a data receiving method is provided, including: receiving, by a second terminal device, second information from a first terminal device by using a first carrier, where the second information is used to indicate a second carrier, the first carrier is one of at least two carriers, the second carrier is at least one carrier in the at least two carriers other than the first carrier, and the second information is used to indicate that at least two pieces of data corresponding to a same transport block are transmitted on the at least two carriers; and receiving, by the second terminal device, the at least two pieces of data from the first terminal device by using the at least two carriers.

According to the data receiving method provided in this embodiment, the second terminal device receives the second information from the first terminal device, where the second information indicates that the at least two pieces of data corresponding to the same transport block are transmitted on the at least two carriers, and receives the at least two pieces of data from the first terminal device on the at least two carriers, so as to improve reliability of data transmission; and the at least two pieces of data may be sent simultaneously, so that an increased latency caused by a plurality of transmissions of the at least two pieces of data in different time units is avoided.

In one embodiment, the second information includes at least one piece of first identification information, and the at least one piece of first identification information is used to indicate the at least two carriers.

The first terminal device may send a plurality of pieces of second information to the second terminal device, where each piece of second information includes at least one piece of first identification information used to indicate the second carrier, and the second terminal device may determine that a carrier occupied by the second information is used to transmit one piece of the at least two pieces of data. The second information may not need to indicate the carrier occupied by the second information, so that signaling overheads are reduced.

In one embodiment, before the second terminal device receives the second information from the first terminal device, the method further includes: receiving, by the second terminal device, first configuration information and second configuration information from the network device, where the first configuration information is used to configure identification information of the at least two carriers as the first identification information, and the second configuration information is used to configure time-frequency resource pools corresponding to the at least two carriers.

The network device configures the identification information of the at least two carriers and the time-frequency resource pools of the at least two carriers by using the configuration information, so as to flexibly schedule the second terminal device to receive the at least two pieces of data by using the at least two carriers. In addition, only one piece of first identification information is needed to indicate the at least two carriers, thereby reducing signaling overheads.

In one embodiment, before the second terminal device receives the second information from the first terminal device, the method further includes: receiving, by the second terminal device, second configuration information and third configuration information from the network device, where the second configuration information is used to configure time-frequency resource pools corresponding to the at least two carriers, the third configuration information is used to configure an association relationship, and the association relationship is used to indicate that the at least two pieces of data corresponding to the same transport block are transmitted on the at least two carriers.

The network device configures the time-frequency resource pools of the at least two carriers and an association relationship between the identification information of the at least two carriers by using the configuration information, so as to flexibly schedule the second terminal device to receive the at least two pieces of data by using the at least two carriers. In addition, only one piece of first identification information is needed to indicate the at least two carriers, thereby reducing signaling overheads.

According to a fourth aspect, an information sending apparatus is provided. The apparatus can implement functions performed by the network device in the method in the first aspect. The functions may be implemented by using hardware, or may be implemented by hardware by executing corresponding software. The hardware or software includes one or more units or modules corresponding to the functions.

In one embodiment, a structure of the apparatus includes a processor and a transceiver. The processor is configured to support the apparatus in performing the corresponding function in the method in the first aspect. The transceiver is configured to support communication between the apparatus and another network element. The apparatus may further include a memory. The memory is coupled to the processor, and stores a program instruction and data that are necessary to the apparatus.

According to a fifth aspect, a data sending apparatus is provided. The apparatus can implement functions performed by the first terminal device in the method in the second aspect. The functions may be implemented by using hardware, or may be implemented by hardware by executing corresponding software. The hardware or software includes one or more units or modules corresponding to the functions.

In one embodiment, a structure of the apparatus includes a processor and a transceiver. The processor is configured to support the apparatus in performing the corresponding function in the method in the first aspect. The transceiver is configured to support communication between the apparatus and another network element. The apparatus may further include a memory. The memory is coupled to the processor, and stores a program instruction and data that are necessary to the apparatus.

According to a sixth aspect, a data receiving apparatus is provided. The apparatus can implement functions performed by the second terminal device in the method in the third aspect. The functions may be implemented by using hardware, or may be implemented by hardware by executing corresponding software. The hardware or software includes one or more units or modules corresponding to the functions.

In one embodiment, a structure of the apparatus includes a processor and a transceiver. The processor is configured to support the apparatus in performing the corresponding function in the method in the first aspect. The transceiver is configured to support communication between the apparatus and another network element. The apparatus may further include a memory. The memory is coupled to the processor, and stores a program instruction and data that are necessary to the apparatus.

According to a seventh aspect, the present disclosure further provides a network system. The network system includes the information sending apparatus according to the fourth aspect, the data sending apparatus according to the fifth aspect, and the data receiving apparatus according to the sixth aspect.

According to an eighth aspect, a computer readable storage medium is provided. The computer readable storage medium stores computer program code. When the computer program code is executed by a processing unit or a processor, a network device performs the method according to the first aspect.

According to a ninth aspect, a computer readable storage medium is provided. The computer readable storage medium stores computer program code. When the computer program code is executed by a processing unit or a processor, a first terminal device performs the method according to the second aspect.

According to a tenth aspect, a computer readable storage medium is provided. The computer readable storage medium stores computer program code. When the computer program code is executed by a processing unit or a processor, a second terminal device performs the method according to the third aspect.

According to an eleventh aspect, a communications chip is provided. The communications chip stores an instruction, and when the instruction runs on a network device, the communications chip performs the method in the first aspect.

According to a twelfth aspect, a communications chip is provided. The communications chip stores an instruction, and when the instruction runs on a first terminal device, the communications chip performs the method in the second aspect.

According to a thirteenth aspect, a communications chip is provided. The communications chip stores an instruction, and when the instruction runs on a second terminal device, the communications chip performs the method in the third aspect.

According to a fourteenth aspect, a computer program product is provided. The computer program product includes computer program code, and when the computer program code is executed by a communications unit or a transceiver and a processing unit or a processor of a network device, the network device performs the method in the first aspect.

According to a fifteenth aspect, a computer program product is provided. The computer program product includes computer program code, and when the computer program code is executed by a communications unit or a transceiver and a processing unit or a processor of a first terminal device, the first terminal device performs the method in the second aspect.

According to a sixteenth aspect, a computer program product is provided. The computer program product includes computer program code, and when the computer program code is executed by a communications unit or a transceiver and a processing unit or a processor of a second terminal device, the second terminal device performs the method in the third aspect.

BRIEF DESCRIPTION OF DRAWINGS

FIG. 3 is a schematic diagram of a method for indicating two carriers according to the present disclosure;

FIG. 4 is a schematic diagram of a method for indicating three carriers according to the present disclosure;

FIG. 9 is a schematic diagram of a data sending method according to the present disclosure;

FIG. 10 is a schematic diagram of a data receiving method according to the present disclosure;

DESCRIPTION OF EMBODIMENTS

The following describes technical solutions of the present disclosure with reference to accompanying drawings.

Figures 1, 2:
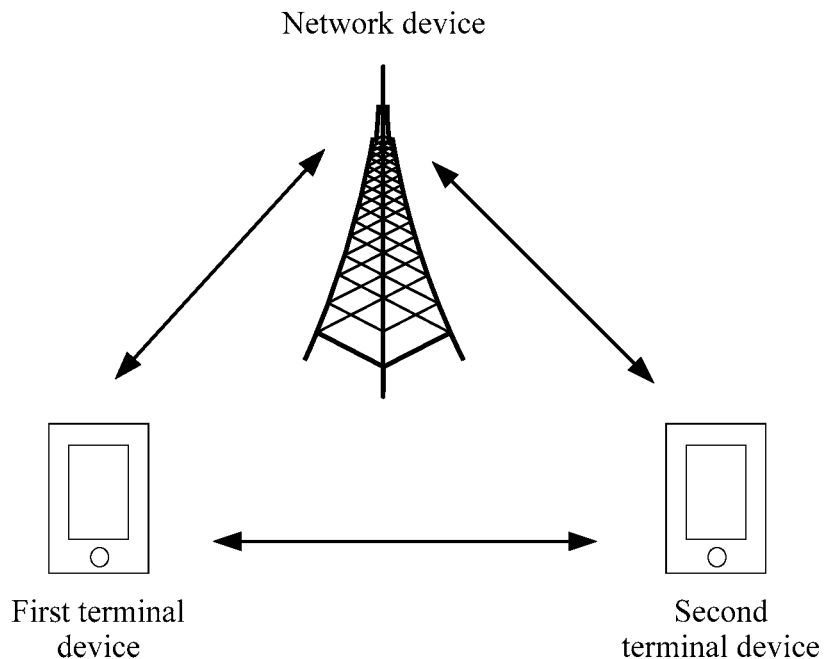
FIG. 1 shows a communications system applicable to the present disclosure.
FIG. 2 is a schematic diagram of an information sending method according to the present disclosure.

FIG. 1 shows a communications system applicable to the present disclosure. The communications system includes a network device, a first terminal device, and a second terminal device. The three devices communicate by using a wireless network. When the first terminal device sends data, a wireless communications module of the first terminal device may obtain data bits that need to be sent to the network device or the second terminal device through a channel. These data bits are, for example, data bits that are generated by a processing module of the first terminal device, received from another device, or stored in a storage module of the first terminal device.

The communications system is merely an example for description. A communications system applicable to the present disclosure is not limited thereto. For example, the communications system applicable to the present disclosure may alternatively include only the first terminal device and the second terminal device shown in FIG. 1. For another example, the technical solutions provided in the present disclosure may be applied to a device-to-device (device to device, D2D) communications system, a long term evolution (long term evolution, LTE) communications system, and a 5th generation (the 5th generation, 5G) mobile communications system, in addition to a V2X communications system.

The terminal device in the present disclosure may also be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a handheld device having a wireless communication function, a computing device or another processing device connected to a wireless modem, an in-vehicle device, a wearable device, or user equipment in a 5G mobile communications system.

The network device may be a base transceiver station (base transceiver station, BTS) in a code division multiple access (code division multiple access, CDMA) system, or may be a NodeB (NB) in a wideband code division multiple access (WCDMA) system, or may be an evolved NodeB (eNB) in an LTE system, or may be a next generation NodeB (gNB) in a 5G mobile communications system. The base stations are merely examples, and the network device may alternatively be a relay station, an access point, an in-vehicle device, a wearable device, or another type of device.

FIG. 2 is a schematic diagram of an information sending method according to the present disclosure. As shown in FIG. 2, the method 200 includes the following steps.

S201. A network device generates first information, where the first information is used to indicate at least two carriers, the first information is used to indicate that at least two pieces of data corresponding to a same transport block are transmitted on the at least two carriers, and the at least two carriers are in a one-to-one correspondence with the at least two pieces of data.

S202. The network device sends the first information to a first terminal device.

In the present disclosure, the first information is any information that is used to indicate at least two carriers and that is used to indicate that at least two pieces of data corresponding to a same transport block are transmitted on the at least two carriers. In other words, the first information may be one piece of information, or may be a plurality of pieces of information, and a name of the first information should not be understood as a limitation on a protection scope of the present disclosure.

The first information may be used to indicate two carriers, or may be used to indicate two frequency domain resources in one carrier, for example, used to indicate two physical resource block (physical resource block, PRB) sets or two sub-channel sets in one carrier. The first terminal device may send the at least two pieces of data corresponding to the same transport block to a second terminal device or the network device by using the two PRB sets or the two sub-channel sets.

After the first terminal device receives the first information from the network device, the first terminal device may send the at least two pieces of data to the second terminal device or the network device on the at least two carriers indicated by the first information, where the at least two pieces of data correspond to the same transport block, so as to improve reliability of data transmission; and the at least two pieces of data may be sent simultaneously, so that an increased latency caused by a plurality of transmissions of the at least two pieces of data in different time units is avoided. A manner in which the first terminal device sends the at least two pieces of data by using the at least two carriers may be a carrier aggregation manner used to send the at least two pieces of data, or may be another manner used to send the at least two pieces of data.

In the present disclosure, the first terminal device may simultaneously send the at least two pieces of data corresponding to the same transport block, or may not simultaneously send the at least two pieces of data. When the at least two pieces of data are sent in different time units (for example, time domain symbols, slots, or subframes), the first terminal device may increase transmit power, so as to improve reliability of data transmission.

In the present disclosure, the network device may indicate, by using the first information, a transmission time interval of a plurality of pieces of data corresponding to a same transport block, or the network device may configure, by using configuration information, the transmission time interval before sending the first information. The first terminal device may alternatively determine the transmission time interval based on preset information. It should be understood that transmission time intervals of two pieces of adjacent data in the plurality of pieces of data may be the same or may be different.

In addition, the network device may send the at least two pieces of data corresponding to the same transport block to the first terminal device by using the at least two carriers indicated by the first information. The present disclosure is described below by using an example in which the first terminal device sends the at least two pieces of data corresponding to the same transport block. However, the present disclosure is not limited thereto.

In some embodiments, the first information includes at least two pieces of first identification information, and the at least two pieces of first identification information are used to indicate the at least two carriers.

The first identification information may be, for example, a CIF. The network device may send a plurality of pieces of first information to the first terminal device. Each piece of first information may include a CIF of another carrier in addition to a CIF of a carrier used by the first information. Therefore, the first terminal device may determine the at least two carriers based on the CIF. The solution is easy to implement.

FIG. 3 is a schematic diagram of a method for indicating two carriers according to the present disclosure.

A network device sends two pieces of downlink control information (downlink control information, DCI) to a first terminal device: DCI 1 and DCI 2. As shown in FIG. 3, the DCI 1 includes the two CIFs. A value of one CIF is 1, which indicates that the first terminal device sends data on a carrier whose CIF is 1. The DCI 1 further includes scheduling information of a carrier whose CIF is 1. A value of the other CIF is 2, which indicates that the first terminal device sends data on a carrier whose CIF is 2. The two CIFs jointly indicate that the first terminal device sends two pieces of data corresponding to a same transport block. The DCI 2 also includes two CIFs. Values of the two CIFs are 1 and 2 respectively. Unlike the DCI 1, carrier scheduling information included in the DCI 2 is the scheduling information of the carrier whose CIF is 2.

After receiving the DCI 1 and the DCI 2, the first terminal device may determine, based on the DCI 1 and the DCI 2, to send two pieces of data corresponding to a same transport block on the two carriers whose CIFs are 1 and 2. For example, the first terminal device may determine, based on a fact that the two CIFs in the DCI 1 and the two CIFs in the DCI 2 are the same, to send data corresponding to a same transport block on the two carriers whose CIFs are 1 and 2. A beneficial effect of scheduling the two carriers by the network device by using two pieces of DCI rather than one piece of DCI is that only one CIF needs to be added based on an existing DCI format, and carrier scheduling information does not need to be added to the DCI. The solution is easy to implement.

It should be understood that, in the information shown in FIG. 3, the DCI 1 or the DCI 2 is equivalent to the first information in S201, and two CIFs in the DCI 1 or the DCI 2 are equivalent to the at least two pieces of first identification information; or the DCI 1 and the DIC 2 may be considered as the first information, and the four CIFs in the DCI 1 and the DIC 2 may be considered as the at least two pieces of first identification information.

When the network device determines that data corresponding to a same transport block is transmitted on a carrier rather than another carrier, the network device may set a value of one CIF of a plurality of CIFs included in the DCI to a special value. For example, carrier scheduling information carried in the DCI 1 is the scheduling information of the carrier whose CIF is 1. In this case, the network device may set a value of another CIF in the DCI 1 to 0. Alternatively, the network device may set values of two CIFs to a same value. For example, the network device may set the values of the two CIFs in the DCI 1 to 1.

When the network device instructs the first terminal device to transmit the data corresponding to the same transport block on three or more carriers, at least three carriers may be indicated by using three or more CIFs in one piece of DCI according to the method shown in FIG. 3, or at least three carriers may be indicated according to a method shown in FIG. 4.

FIG. 4 is a schematic diagram of a method for indicating three carriers according to the present disclosure.

As shown in FIG. 4, a network device sends three pieces of DCI to a first terminal device: DCI 1, DCI 2, and DCI 3. Each DCI includes two CIFs. The DCI 1 further includes scheduling information of a carrier whose CIF is 1. The DCI 2 further includes scheduling information of a carrier whose CIF is 2. The DCI 3 further includes scheduling information of a carrier whose CIF is 3. After receiving the three pieces of DCI, the first terminal device determines, based on the first CIF (CIF=1) and the second CIF (CIF=2) in the DCI 1, and the first CIF (CIF=2) in the DCI 2, data corresponding to a same transport block is transmitted on two carriers whose CIFs are 1 and 2, determines, based on the first CIF (CIF=2) and the second CIF (CIF=3) in the DCI 2, and the first CIF (CIF=3) in the DCI 2, the data corresponding to the same transport block is transmitted on two carriers whose CIFs are 2 and 3, and determines, based on the first CIF (CIF=3) and the second CIF (CIF=1) in the DCI 3, and the first CIF (CIF=1) in the DCI 1, the data corresponding to the same transport block is transmitted on two carriers whose CIFs are 3 and 1, so as to determine to send the data corresponding to the same transport block on three carriers whose CIFs are 1, 2, and 3. Compared with the method for indicating three carriers by using three CIFs in one piece of DCI, the method shown in FIG. 4 reduces information overheads.

In one example, after separately determining that the data corresponding to the same transport block is transmitted on two carriers whose CIFs are 1 and 2, and the data corresponding to the same transport block is transmitted on two carriers whose CIFs are 2 and 3, the first terminal device may determine to send the same transport block on three carriers whose CIFs are 1, 2, and 3. Therefore, the first terminal device does not need to determine, based on the DCI 3 and the DCI 1, that the data corresponding to the same transport block is transmitted on two carriers whose CIFs are 3 and 1. For example, a value of the second CIF of the DCI 3 may be set to a special value to terminate a correspondence of carriers, for example, the value of the second CIF of the DCI 3 may be set to 0, or values of two CIFs of the DCI 3 are set to 3.

It should be understood that, in the information shown in FIG. 4, any one of the DCI 1, the DCI 2, and the DCI 3 is equivalent to the first information in S201, and two CIFs in any one of the three pieces of DCI are equivalent to the at least two pieces of first identification information; or the DCI 1, the DCI 2, and the DCI 3 may be considered as the first information, and all CIFs included in the three pieces of DCI may be considered as the at least two pieces of first identification information.

In the method shown in FIG. 4, the network device may indicate a time interval of data transmitted on two carriers in sequence. For example, the network device may indicate, by using the DCI 1, a first time interval between data transmitted on a carrier whose CIF is 1 and data transmitted on a carrier whose CIF is 2. Alternatively, the network device may indicate, by using the DCI 2, a second time interval between data transmitted on a carrier whose CIF is 2 and data transmitted on a carrier whose CIF is 3. The first time interval and the second time interval may be the same or different. When the first time interval is the same as the second time interval, the network device may indicate, by using one piece of DCI (the DCI 1 or the DCI 2), a time interval of data transmitted on two carriers. It should be noted that all the foregoing data refers to the data corresponding to the same transport block, and the method is also applicable to the methods shown in FIG. 3, FIG. 5, and FIG. 6.

In some embodiments, the first information includes at least two pieces of indication information, any one of the at least two pieces of indication information includes one piece of first identification information and one piece of second identification information, the one piece of first identification information is used to indicate one of at least two carriers, the second identification information in the at least two pieces of indication information is the same, and the second identification information in the at least two pieces of indication information is used to indicate that at least two pieces of data corresponding to a same transport block are transmitted on the at least two carriers.

In this embodiment, carriers that have the same second identification information are used to transmit the data corresponding to the same transport block. Therefore, the network device needs to add only one identification information field to schedule the first terminal device to simultaneously transmit data corresponding to a plurality of transport blocks. The solution is easy to implement.

Figure 5:
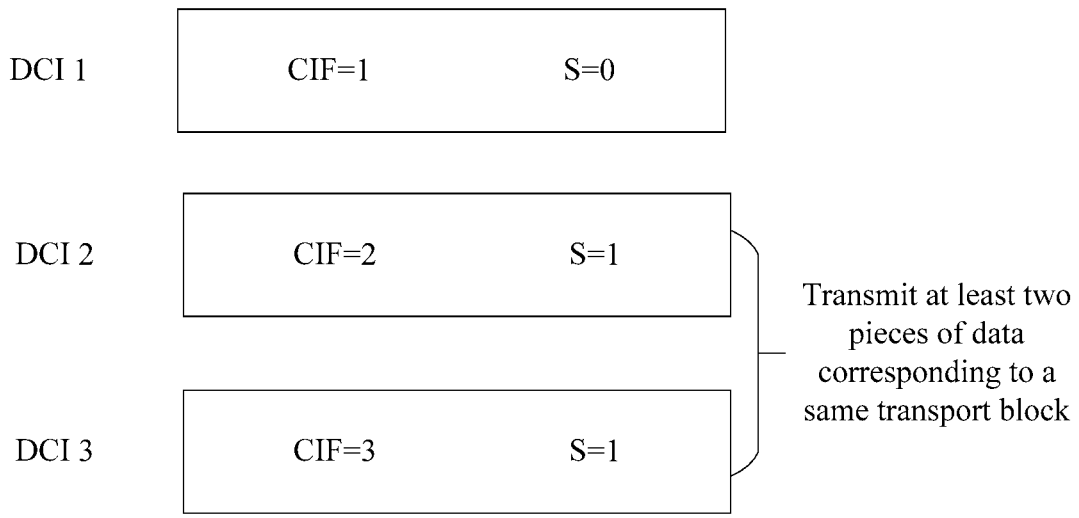
FIG. 5 is a schematic diagram of another method for indicating two carriers according to the present disclosure.

FIG. 5 is a schematic diagram of another method for indicating two carriers according to the present disclosure.

A network device sends three pieces of DCI to a first terminal device: DCI 1, DCI 2, and DCI 3. Each DCI includes one CIF (namely, first identification information) and one S (namely, second identification information). The CIF is used to indicate a carrier corresponding to carrier scheduling information carried in the DCI. Carriers indicated by DCI with a same S value are used to transmit data corresponding to a same transport block.

As shown in FIG. 5, in the three pieces of DCI, only a value of S of the DCI 1 is different from a value of S of another piece of DCI. Therefore, after receiving the three pieces of DCI, the first terminal device determines that the data corresponding to the same transport block is transmitted on a carrier whose CIF is 1 rather than another carrier. Carriers whose CIFs are 2 and 3 are used to transmit at least two pieces of data corresponding to a same transport block.

The network device may further set a value of S to 2 bits. In this case, S may indicate at most four statuses, and each status corresponds to one group of carriers used to transmit a same transport block. Therefore, the network device may simultaneously schedule the first terminal device to transmit data corresponding to a plurality of transport blocks.

Figure 6:
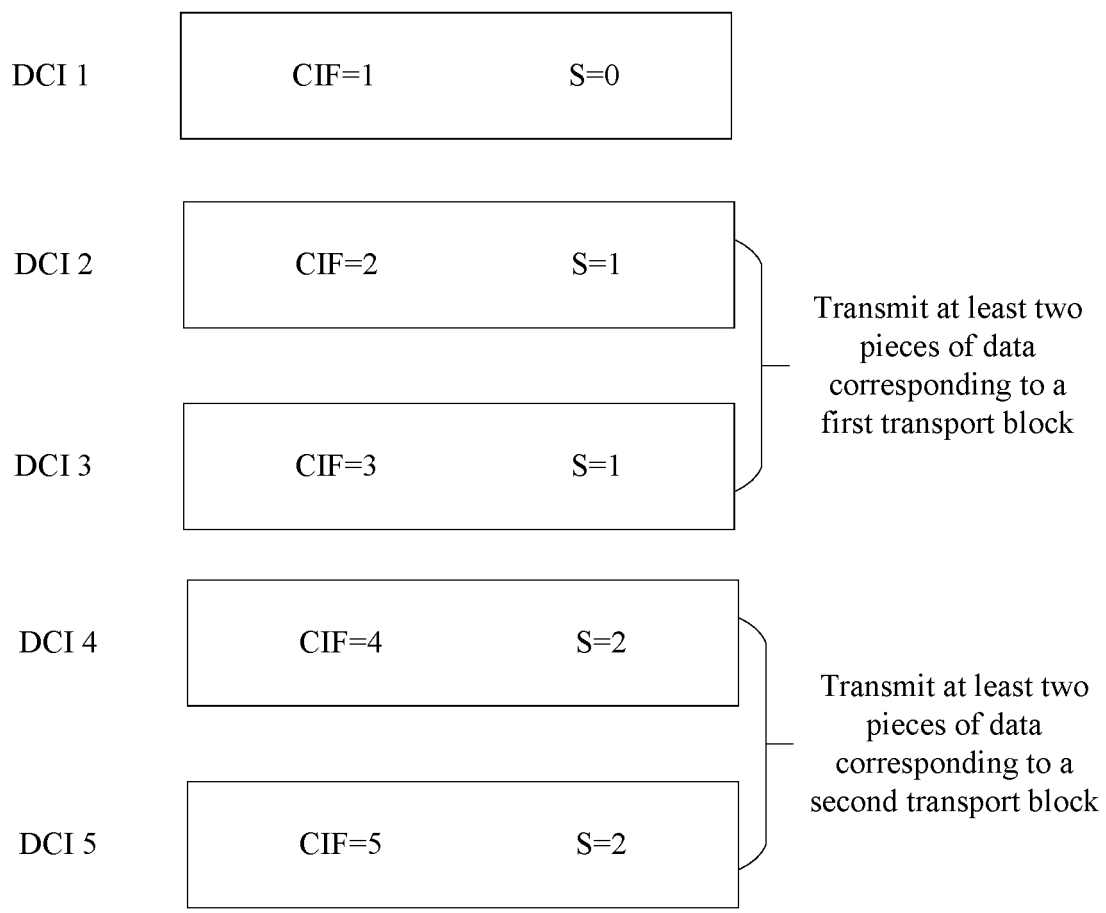
FIG. 6 is a schematic diagram of a method for indicating a plurality of groups of carriers according to the present disclosure.

FIG. 6 is a schematic diagram of a method for indicating a plurality of groups of carriers according to the present disclosure.

A network device sends five pieces of DCI to a first terminal device: DCI 1, DCI 2, DCI 3, DCI 4, and DCI 5. Each DCI includes one CIF and one S. A value of S of the DCI 1 may be set to a special value. For example, the special value is 0. The special value indicates that data transmitted on a carrier indicated by the DCI 1 is different from data transmitted on a carrier indicated by another piece of DCI. FIG. 6 shows only one piece of DCI (namely, the DCI 1) whose S value is the special value. The network device may further send, to the first terminal device, a plurality of pieces of DCI whose S values are the special value. Data transmitted on carriers indicated by the DCI whose S values are the special value is different.

S values of the DCI 2 and the DIC 3 are the same, and S values of the DCI 4 and the DCI 5 are the same. After receiving the five pieces of DCI, the first terminal device determines that data corresponding to a same transport block is transmitted on a carrier whose CIF is 1 rather than another carrier. Carriers whose CIFs are 2 and 3 are used to transmit at least two pieces of data corresponding to a first transport block, and carriers whose CIFs are 4 and 5 are used to transmit at least two pieces of data corresponding to a second transport block.

In some embodiments, first information includes one piece of first identification information, and the one piece of first identification information is used to indicate at least two carriers.

In a communications system, identification information of the at least two carriers may be pre-configured as the first identification information. A relationship between time-frequency resource pools of the two carriers may also be pre-configured. In this way, the network device needs to send only one piece of first identification information to schedule the first terminal device to transmit at least two pieces of data by using the at least two carriers, so that signaling overheads can be reduced.

In some embodiments, before the network device sends the first information to the first terminal device, the method 200 further includes the following step.

S203. The network device sends first configuration information and second configuration information to the first terminal device, where the first configuration information is used to configure identification information of the at least two carriers to be the first identification information, and the second configuration information is used to configure time-frequency resource pools corresponding to the at least two carriers.

In S203, the first configuration information and the second configuration information may be sent simultaneously, or may not be sent simultaneously. The present disclosure is not limited thereto. The network device configures the identification information of the at least two carriers and the time-frequency resource pools of the at least two carriers by using the configuration information, so as to flexibly schedule the first terminal device to transmit the at least two pieces of data by using the at least two carriers.

Figure 7:
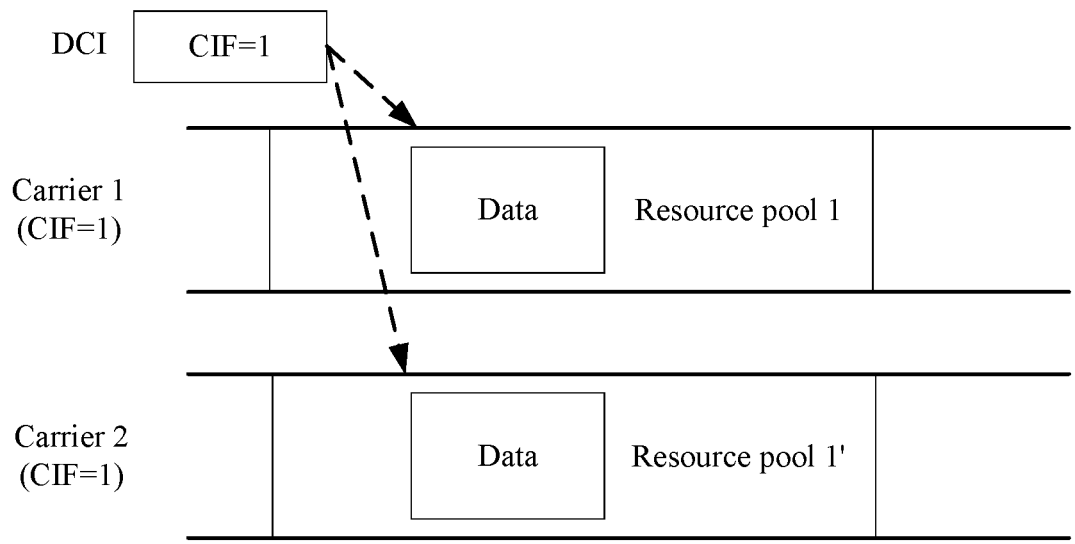
FIG. 7 is a schematic diagram of still another method for indicating two carriers according to the present disclosure.

FIG. 7 is a schematic diagram of still another method for indicating two carriers according to the present disclosure.

A network device configures, by using second configuration information, a carrier 1 and a carrier 2 to use a same time-frequency resource pool ("resource pool" for short below). For example, a resource pool 1 is configured on the carrier 1, and a resource pool 1' is configured on the carrier 2. Both the resource pool 1 and the resource pool 1' include subframes 1, 3, 5, and 7 in time domain. Both the resource pools include PRBs whose sequence numbers are 1 to 20 in frequency domain. Frequency domains of the two resource pools may further include a same quantity of sub-channels (subchannel). A quantity of PRBs included in each sub-channel may also be the same.

The network device configures a common CIF value for the carrier 1 and the carrier 2 by using first configuration information. For example, the CIF value is 1.

The network device sends one piece of DCI to a first terminal device. The one piece of DCI includes one CIF (in other words, first information includes one piece of first identification information), and a value of the CIF is 1.

After receiving the DCI, the first terminal device determines to send at least two pieces of data corresponding to a same transport block on two carriers whose CIF is 1. The first terminal device may send, based on carrier scheduling information carried in the DCI, the at least two pieces of data corresponding to the same transport block on the carrier 1 and the carrier 2.

The embodiment is merely an example for description. The present disclosure is not limited thereto. For example, the resource pool 1 and the resource pool 1' may alternatively be different configured resource pools. The network device separately configures the two resource pools, or the network device configures one of the resource pools, and sends a correspondence (for example, a frequency domain offset or a time domain offset) between the two resource pools to the first terminal device, so that the first terminal device can determine resource configuration of at least two carriers based on the first information.

In some embodiments, the first configuration information is carried in a broadcast message or an RRC dedicated message (for example, an RRC connection reconfiguration message), and the second configuration information is carried in the broadcast message or the RRC dedicated message.

The network device may configure at least two carriers by using the broadcast message. When sending data to a second terminal device by using the at least two carriers, the first terminal device does not need to indicate to the second terminal device that data corresponding to a same transport block is transmitted on the at least two carriers, so that signaling overheads are reduced.

In some embodiments, the first information includes one piece of first identification information, and the one piece of first identification information is used to indicate one of the at least two carriers.

In a communications system, an association relationship between the identification information of the at least two carriers may be pre-configured. The association relationship is used to indicate that the at least two pieces of data corresponding to the same transport block are transmitted on the at least two carriers. The network device needs to send only one piece of first identification information to schedule the first terminal device to transmit the at least two pieces of data by using the at least two carriers, so that signaling overheads are reduced.

In some embodiments, before the network device sends the first information to the first terminal device, the method 200 further includes the following step.

S204. The network device sends second configuration information and third configuration information to the first terminal device, where the second configuration information is used to configure time-frequency resource pools corresponding to the at least two carriers, the third configuration information is used to configure an association relationship, and the association relationship is used to indicate that the at least two pieces of data corresponding to the same transport block are transmitted on the at least two carriers.

Any association relationship that can directly or indirectly indicate that the at least two pieces of data corresponding to the same transport block are transmitted on the at least two carriers falls within a protection scope of the present disclosure. For example, the network device may configure, by using the third configuration information, the identification information of the at least two carriers to have the association relationship, so as to flexibly schedule the first terminal device to transmit the at least two pieces of data by using the at least two carriers.

Figure 8:
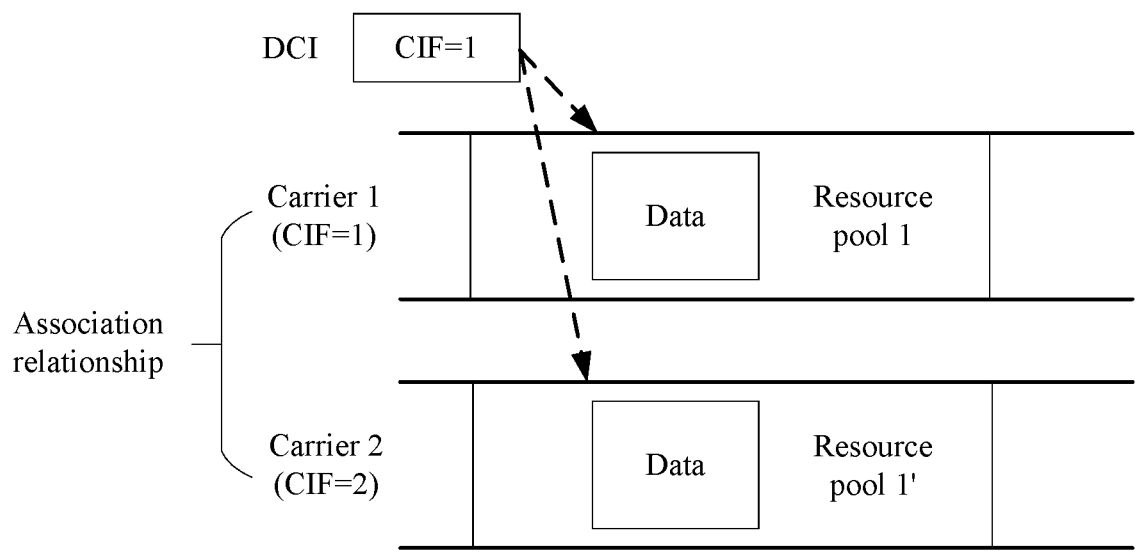
FIG. 8 is a schematic diagram of still another method for indicating two carriers according to the present disclosure.

FIG. 8 is a schematic diagram of still another method for indicating two carriers according to the present disclosure.

A network device configures, by using second configuration information, a carrier 1 and a carrier 2 to use a same time-frequency resource pool ("resource pool" for short below). The carrier 1 corresponds to a resource pool 1, and the carrier 2 corresponds to a resource pool 1'.

The network device configures, by using third configuration information, an association relationship between the carrier 1 (CIF=1) and the carrier 2 (CIF=2). The association relationship is used to indicate that at least two pieces of data corresponding to a same transport block are transmitted on the carrier 1 and the carrier 2.

The network device sends one piece of DCI to a first terminal device. The one piece of DCI includes one CIF (in other words, first information includes one piece of first identification information), and a value of the CIF is either 1 or 2.

After receiving the DCI, the first terminal device determines, based on the DCI and the association relationship, that the at least two pieces of data corresponding to the same transport block are transmitted on the carrier 1 and the carrier 2.

The embodiment is merely an example for description. The present disclosure is not limited thereto. For example, the resource pool 1 and the resource pool 1' may alternatively be different configured resource pools. The network device separately configures the two resource pools, or the network device configures one of the resource pools, and sends a correspondence (for example, a frequency domain offset or a time domain offset) between the two resource pools to the first terminal device, so that the first terminal device can determine resource configuration of at least two carriers based on the first information.

In some embodiments, the second configuration information is carried in a broadcast message or an RRC dedicated message, and the third configuration information is carried in the broadcast message or the RRC dedicated message.

The network device may configure at least two carriers by using the broadcast message. When sending data to a second terminal device by using the at least two carriers, the first terminal device does not need to indicate to the second terminal device that data corresponding to a same transport block is transmitted on the at least two carriers, so that signaling overheads are reduced.

In some embodiments, in the present disclosure, the at least two pieces of data that are corresponding to the same transport block and that are sent by the first terminal device may be in a same redundancy version, or may be in different redundancy versions.

For example, the first terminal device may transmit one same and fixed redundancy version on carriers, in other words, redundancy versions of data transmitted on the carriers are the same, and the redundancy version does not change with time. In this case, the network device does not need to indicate the redundancy version to the first terminal device again; when sending data to the second terminal device, the first terminal device does not need to indicate the redundancy version; and when receiving the data, the second terminal device or the network device performs decoding according to a default redundancy version.

For another example, the first terminal device transmits one same and variable redundancy version on carriers, in other words, redundancy versions of data transmitted on the carriers are the same, and the redundancy version may change with time. In this case, the network device needs to indicate to the first terminal device that the first terminal device sends the redundancy version used by the data, and the first terminal device also needs to indicate to the second terminal device that the first terminal device sends the redundancy version used by the data, so that the second terminal device decodes the data.

For still another example, the first terminal device may transmit different redundancy versions on carriers; the network device may indicate, to the first terminal device, the redundancy versions corresponding to the carriers; and the first terminal device may indicate, to the second terminal device, the redundancy versions corresponding to the carriers. Alternatively, the network device does not indicate, to the first terminal device, the redundancy versions corresponding to the carriers, and the first terminal device does not indicate, to the second terminal device, the redundancy versions corresponding to the carriers; the first terminal device sends data based on a correspondence between each carrier and a redundancy version; and the second terminal device or the network device also decodes the received data based on the correspondence between each carrier and a redundancy version.

The correspondence between each carrier and a redundancy version may be a correspondence between a redundancy version number and a CIF value. For example, if the redundancy version numbers are arranged in a sequence of 0, 1, 2, and 3, and the CIF values of the carrier are arranged in a sequence of 1, 2, and 3, the carrier 1 corresponds to a redundancy version 0, the carrier 2 corresponds to a redundancy version 1, and a carrier 3 corresponds to a redundancy version 2.

The correspondence between each carrier and a redundancy version may alternatively be a correspondence between a redundancy version number sequence and a carrier configuration sequence, may be a correspondence between a sequence of carriers indicated by DCI and a redundancy version number sequence, or may be another correspondence that may be used to determine a redundancy version number corresponding to a carrier.

The foregoing has described in detail, from a perspective of the network device, the method for sending the at least two pieces of data corresponding to the same transport block on the at least two carriers provided in the present disclosure. The following describes, from a perspective of the first terminal device, a data sending method provided in the present disclosure.

FIG. 9 shows a data sending method according to the present disclosure. The method 900 includes the following steps.

S901. A first terminal device determines at least two carriers, where the at least two carriers are used to transmit at least two pieces of data corresponding to a same transport block, and the at least two carriers are in a one-to-one correspondence with the at least two pieces of data.

S902. The first terminal device sends the at least two pieces of data to a second terminal device or a network device by using the at least two carriers.

In S901, the first terminal device may determine the at least two carriers based on information sent by the network device, or may determine the at least two carriers, for example, the first terminal device may run a program stored in the first terminal device to determine the at least two carriers.

In S902, the first terminal device may send the at least two pieces of data to the second terminal device or the network device on the at least two carriers, where the at least two pieces of data correspond to the same transport block, so as to improve reliability of data transmission; and the at least two pieces of data may be sent simultaneously, so that an increased latency caused by a plurality of transmissions of the at least two pieces of data in different time units is avoided.

In some embodiments, that the first terminal device determines the at least two carriers includes the following steps.

S903. The first terminal device receives first information from the network device, where the first information is used to indicate the at least two carriers, and the first information is used to indicate that the at least two pieces of data corresponding to the same transport block are transmitted on the at least two carriers.

S904. The first terminal device determines the at least two carriers based on the first information.

The first terminal device may determine the at least two carriers based on the first information sent by the network device, so as to flexibly determine the at least two carriers.

A person skilled in the art may clearly understand that, in the method 900, the first terminal device may be equivalent to the first terminal device in the method 200, the first information may be equivalent to the first information in the method 200, and the method for receiving the first information by the first terminal device corresponds to the method for sending the first information by the network device in the method 200. For brevity, details are not described herein again.

In some embodiments, the first information includes at least two pieces of first identification information, and the at least two pieces of first identification information are used to indicate the at least two carriers.

The first identification information may be, for example, a CIF. The network device may send a plurality of pieces of first information to the first terminal device. Each piece of first information may include a CIF of another carrier in addition to a CIF of a carrier used by the first information. Therefore, the first terminal device may determine the at least two carriers based on the CIF. The solution is easy to implement.

In some embodiments, the first information includes at least two pieces of indication information, any one of the at least two pieces of indication information includes one piece of first identification information and one piece of second identification information, the one piece of first identification information is used to indicate one of the at least two carriers, the second identification information in the at least two pieces of indication information is the same, and the second identification information in the at least two pieces of indication information is used to indicate that the at least two pieces of data corresponding to the same transport block are transmitted on the at least two carriers.

In this embodiment, carriers that have the same second identification information are used to transmit data corresponding to a same transport block. Therefore, the network device may schedule the first terminal device to simultaneously transmit data corresponding to a plurality of transport blocks without a need to add additional signaling. The solution is flexible and is easy to implement.

In some embodiments, the first information includes one piece of first identification information, and the one piece of first identification information is used to indicate the at least two carriers.

In a communications system, identification information of the at least two carriers may be pre-configured as the first identification information. The first terminal device needs to receive only one piece of first identification information, to determine to transmit the at least two pieces of data by using the at least two carriers. In this way, signaling overheads are reduced.

In some embodiments, before the first terminal device receives the first information from the network device, the method 900 further includes the following step.

S905. The first terminal device receives first configuration information and second configuration information from the network device, where the first configuration information is used to configure identification information of the at least two carriers as the first identification information, and the second configuration information is used to configure time-frequency resource pools corresponding to the at least two carriers.

The network device configures the identification information of the at least two carriers and the time-frequency resource pools of the at least two carriers by using the configuration information, so as to flexibly schedule the first terminal device to transmit the at least two pieces of data by using the at least two carriers.

In some embodiments, the first information includes one piece of first identification information, and the one piece of first identification information is used to indicate one of the at least two carriers.

In the communications system, an association relationship between the identification information of the at least two carriers may be pre-configured. The association relationship is used to indicate that the at least two pieces of data corresponding to the same transport block are transmitted on the at least two carriers. The first terminal device needs to receive only one piece of first identification information to determine that the at least two pieces of data are transmitted by using the at least two carriers, so that signaling overheads are reduced.

In some embodiments, before the first terminal device receives the first information from the network device, the method 900 further includes the following step.

S906. The first terminal device receives second configuration information and third configuration information from the network device, where the second configuration information is used to configure time-frequency resource pools corresponding to the at least two carriers, the third configuration information is used to configure an association relationship, and the association relationship is used to indicate that the at least two pieces of data corresponding to the same transport block are transmitted on the at least two carriers.

The network device configures the time-frequency resource pools of the at least two carriers and the association relationship between the identification information of the at least two carriers by using the configuration information, so as to flexibly schedule the first terminal device to transmit the at least two pieces of data by using the at least two carriers.

In some embodiments, the method 900 further includes the following step.

S907. The first terminal device sends second information to the second terminal device, where the second information is used to indicate that the at least two pieces of data corresponding to the same transport block are transmitted on the at least two carriers.

If the network device does not indicate the at least two carriers in S901 to the second terminal device, the first terminal device needs to indicate the at least two carriers to the second terminal device and indicate that the at least two carriers are used to transmit the at least two pieces of data corresponding to the same transport block.

By using the second information, the first terminal device may indicate the at least two carriers and indicate that the at least two carriers are used to transmit the at least two pieces of data corresponding to the same transport block. The second information may be one piece of information, or may be a plurality of pieces of information. The first terminal device may send one piece of second information, or may send a plurality of pieces of second information. The second information may be sent before the at least two pieces of data are sent, or the second information may be sent in a same time unit as the at least two pieces of data.

According to the data sending method provided in this embodiment, the first terminal device sends the second information to the second terminal device, where the second information indicates that the at least two pieces of data corresponding to the same transport block are transmitted on the at least two carriers, and sends the at least two pieces of data to the second terminal device on the at least two carriers, so as to improve reliability of data transmission; and the at least two pieces of data may be sent simultaneously, so that an increased latency caused by a plurality of transmissions of the at least two pieces of data in different time units is avoided.

In some embodiments, that the first terminal device sends the second information to the second terminal device includes:

S908. The first terminal device sends the second information to the second terminal device by using a first carrier, where the first carrier is one of the at least two carriers, the second information includes at least one piece of first identification information, the at least one piece of first identification information is used to indicate a second carrier, and the second carrier is at least one carrier in the at least two carriers other than the first carrier.

The first identification information is, for example, a carrier sequence number. The carrier sequence number is used to identify one carrier of a plurality of carriers included in the communications system in which the first terminal device is located. The first terminal device may send a plurality of pieces of second information to the second terminal device. Each piece of second information includes at least one CIF used to indicate a second carrier, so that the second terminal device can determine at least two carriers based on the CIF. The solution is easy to implement.

Different from the first information, because the first terminal device and the second terminal device may determine, based on preset information, that the first carrier is one of the at least two carriers described in S907, the second information may include only one piece of first identification information.

The embodiment is merely an example for description. The data sending method provided in the present disclosure is not limited thereto. For example, the at least two carriers indicated by the second information may not include the first carrier.

A data receiving method provided in the present disclosure is described below from a perspective of the second terminal device.

FIG. 10 is a schematic diagram of a data receiving method according to the present disclosure. The method 1000 includes the following steps.

S1001. A second terminal device receives second information from a first terminal device by using a first carrier, where the second information is used to indicate a second carrier, the first carrier is one of at least two carriers, the second carrier is at least one carrier in the at least two carriers other than the first carrier, and the second information is used to indicate that at least two pieces of data corresponding to a same transport block are transmitted on the at least two carriers.

S1002. The second terminal device receives the at least two pieces of data from the first terminal device by using the at least two carriers.

The second terminal device may detect (for example, through blind detection) the second information on a resource that may be occupied by the second information. When detecting the second information, the second terminal device may determine, based on preset information, that the carrier used for receiving the second information is one of the at least two carriers described in S1001, and determine another carrier based on the second information.

For example, the second terminal device is configured with three carriers: a carrier 1, a carrier 2, and a carrier 3. The first terminal device sends the second information to the second terminal device on the carrier 1, and sends the at least two pieces of data corresponding to the same transport block to the second terminal device on the carrier 1 and the carrier 2. The second information is used to indicate the carrier 2, after receiving the second information by using the carrier 1. In this case, the second terminal device determines that the carrier 1 is one of the at least two carriers S1002, and determines, based on the second information, that the carrier 2 is another carrier in the at least two carriers S1002.

For another example, the second terminal device is configured with three carriers: a carrier 1, a carrier 2, and a carrier 3. The first terminal device sends one piece of second information to the second terminal device on the carrier 1, where the second information is used to indicate the carrier 2. The first terminal device sends another piece of second information to the second terminal device on the carrier 2, where the second information is used to indicate the carrier 1. In this case, after receiving the two pieces of second information, the second terminal device may determine, based on the two pieces of second information, that the at least two pieces of data corresponding to the same transport block are transmitted on the carrier 1 and the carrier 2.

Alternatively, the second terminal device may not determine the at least two carriers based on the second information. For example, when failing to receive the second information, the second terminal device may determine that data transmitted on the carrier 1, the carrier 2, and the carrier 3 corresponds to a same transport block.

After the second terminal device receives the at least two pieces of data described in S1002, in one example, the second terminal device may combine and decode the at least two pieces of data, so as to increase a decoding success rate. In another optional example, after successfully decoding one piece of data in the at least two pieces of data, the second terminal device may not perform combined decoding again. The successful decoding includes that a data check is passed, for example, when both a cyclic redundancy check (cyclic redundancy check, CRC) of a transport block included in data and the CRC of a code block are passed, the data is successfully decoded.

According to the data receiving method provided in this embodiment, the second terminal device first receives the second information from the first terminal device, where the second information indicates that the at least two pieces of data corresponding to the same transport block are transmitted on the at least two carriers, and then receives the at least two pieces of data from the first terminal device on the at least two carriers, so as to improve reliability of data transmission; and the at least two pieces of data may be sent simultaneously, so that an increased latency caused by a plurality of transmissions of the at least two pieces of data in different time units is avoided.

A person skilled in the art may clearly understand that, in the method 1000, the second terminal device may be equivalent to the second terminal devices in the method 200 and the method 900, the second information may be equivalent to the second information in the method 900, and the method for receiving the at least two pieces of data by the second terminal device corresponds to the method for sending the at least two pieces of data by the first terminal device in the method 900. For brevity, details are not described herein again.

In some embodiments, the second information includes at least one piece of first identification information, and the at least one piece of first identification information is used to indicate the at least two carriers.

The first identification information is, for example, a carrier sequence number. The carrier sequence number is used to identify one carrier of a plurality of carriers included in a communications system in which the second terminal device is located. The first terminal device may send a plurality of pieces of second information to the second terminal device. Each piece of second information includes at least one piece of first identification information used to indicate a second carrier. The second terminal device may determine that a carrier occupied by the second information is used to transmit one piece of data in the at least two pieces of data. The second information may not need to indicate the carrier occupied by the second information, so that signaling overheads are reduced.

In some embodiments, before the second terminal device receives the second information from the first terminal device, the method 1000 further includes the following step.

S1003. The second terminal device receives first configuration information and second configuration information from a network device, where the first configuration information is used to configure identification information of the at least two carriers as first identification information, and the second configuration information is used to configure time-frequency resource pools corresponding to the at least two carriers.

For example, the second terminal device may directly determine, based on the second configuration information, resource pools configured on the at least two carriers, or the second terminal device may determine, based on the second configuration information, a resource pool configured on one carrier of the at least two carriers, and determine resource pool configuration on the at least two carriers based on a relationship (for example, offset relationships in time domain and frequency domain) between resource pools corresponding to the at least two carriers.

In addition, the first configuration information configures the identification information of the at least two carriers as the first identification information, and only one piece of the first identification information is needed to indicate the at least two carriers, thereby reducing signaling overheads.

A person skilled in the art may understand that, in the method 1000, the first configuration information and the second configuration information may be equivalent to the first configuration information and the second configuration information in the method 200 and the method 900, and the method for receiving the first configuration information and the second configuration information by the second terminal device corresponds to the method for sending the first configuration information and the second configuration information by the network device in the method 200. For brevity, details are not described again.

In some embodiments, before the second terminal device receives the second information from the first terminal device, the method 1000 further includes the following step.

S1004. The second terminal device receives second configuration information and third configuration information from the network device, where the second configuration information is used to configure time-frequency resource pools corresponding to the at least two carriers, the third configuration information is used to configure an association relationship, and the association relationship is used to indicate that the at least two pieces of data corresponding to the same transport block are transmitted on the at least two carriers.

After the association relationship between the at least two carriers is configured by using the third configuration information, the second terminal device may determine the at least two carriers based on one piece of first identification information, where the one piece of first identification information is identification information of any carrier in the at least two carriers, so that signaling overheads are reduced.

A person skilled in the art may clearly understand that, in the method 1000, the second configuration information and the third configuration information may be equivalent to the second configuration information and the third configuration information in the method 200 and the method 900, and the method for receiving the second configuration information and the third configuration information by the second terminal device corresponds to the method for sending the second configuration information and the third configuration information by the network device in the method 200. For brevity, details are not described again.

The foregoing has described in detail examples of the information sending method, the data sending method, and the data receiving method according to the present disclosure. It may be understood that, to implement the foregoing functions, the network device, the first terminal device, and the second terminal device each includes a corresponding hardware structure and/or software module performing the functions. A person of ordinary skill in the art should easily be aware that, in combination with the example units and algorithms steps described in the embodiments disclosed in this specification, the present disclosure can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In the present disclosure, the network device or the like may be divided into function units based on the foregoing method examples. For example, function unit division may be performed corresponding to the functions, or two or more functions may be integrated into one processing unit. The integrated unit may be implemented in a form of hardware, or may be implemented in a form of a software function unit. It should be noted that the unit division in the present disclosure is an example, and is merely logical function division. There may be another division manner in actual implementation.

Figure 11:
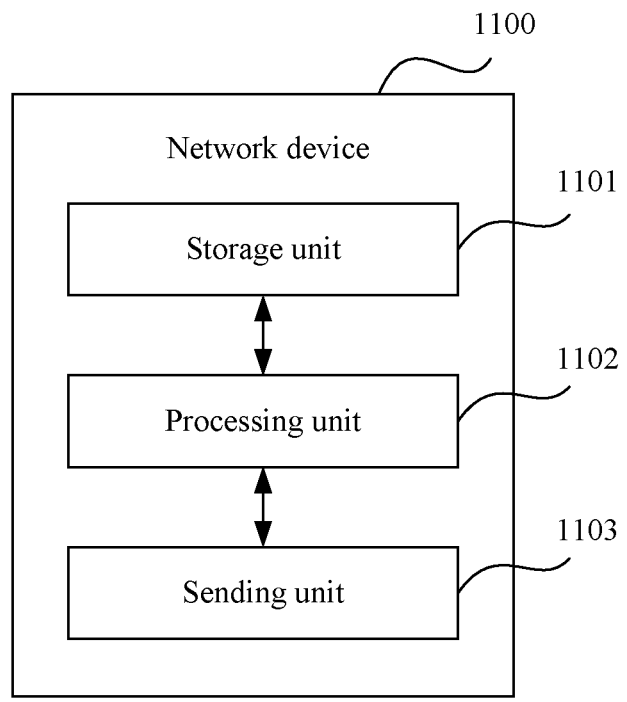
FIG. 11 is a schematic diagram of a possible network device according to the present disclosure.

When an integrated unit is used, FIG. 11 is a possible schematic structural diagram of the network device used in the foregoing embodiments. The network device 1100 includes a processing unit 1102 and a sending unit 1103. The processing unit 1102 is configured to control and manage an action of the network device 1100. For example, the processing unit 1102 is configured to support the network device 1100 in performing S202 in FIG. 2, and/or is configured to perform another process of the technology described in this specification. The sending unit 1103 is configured to support the network device 1100 in communicating with another network entity, for example, communicating with a first terminal device. The network device 1100 may further include a storage unit 1101, configured to store program code and data of the network device 1100.

For example, the processing unit 1102 is configured to generate first information, where the first information is used to indicate at least two carriers, the first information is used to indicate that at least two pieces of data corresponding to a same transport block are transmitted on the at least two carriers, and the at least two carriers are in a one-to-one correspondence with the at least two pieces of data.

The processing unit 1102 is further configured to control the sending unit 1103 to perform the following step: sending the first information to the first terminal device.

The processing unit 1102 may be a processor or a controller, for example, may be a central processing unit (central processing unit, CPU), a general purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The controller/processor may implement or execute various example logical blocks, modules, and circuits described with reference to content disclosed in the present disclosure. Alternatively, the processor may be a combination of processors implementing a computing function, for example, a combination of one or more microprocessors, or a combination of the DSP and a microprocessor. The sending unit 1103 may be a transceiver, a transceiver circuit, or the like. The storage unit 1101 may be a memory.

Figure 12:
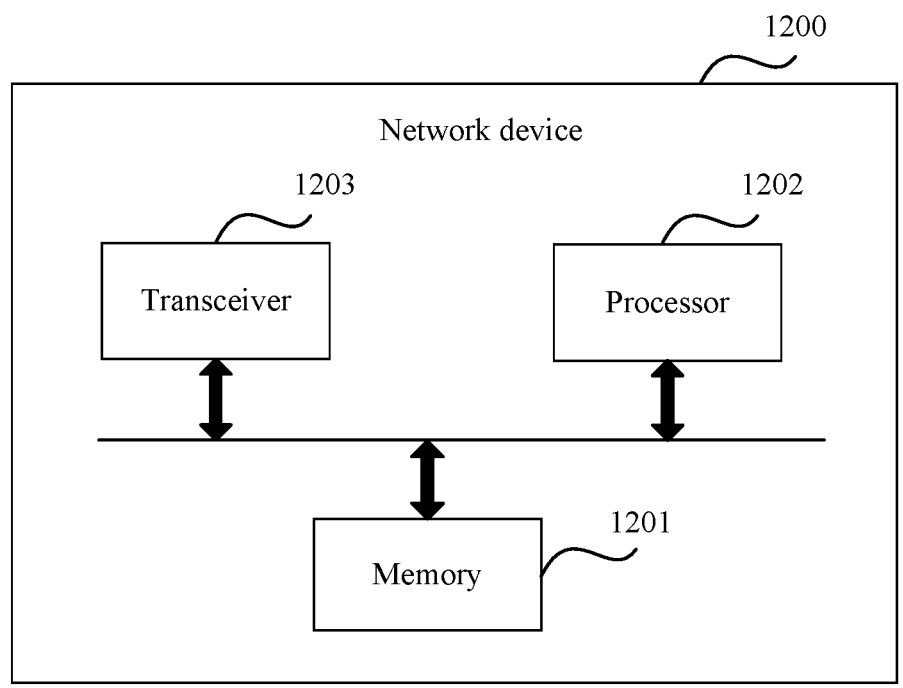
FIG. 12 is a schematic diagram of another possible network device according to the present disclosure.

When the processing unit 1102 is a processor, the sending unit 1103 is a transceiver, and the storage unit 1101 is a memory, the network device used in the present disclosure may be a network device shown in FIG. 12.

As shown in FIG. 12, the network device 1200 includes a processor 1202, a transceiver 1203, and a memory 1201. The transceiver 1203, the processor 1202, and the memory 1201 may communicate with each other by using an internal connection channel, and transmit a control signal and/or a data signal.

A person skilled in the art can clearly understand that for convenience and brevity of description, for specific working processes of the apparatus and units described above, refer to the corresponding processes in the foregoing method embodiments, and no further details are provided herein.

The network device 1100 and the network device 1200 provided in the present disclosure indicate at least two carriers to a first terminal device, so that the first terminal device sends at least two pieces of data to a second terminal device or a network device. The at least two pieces of data correspond to a same transport block. Therefore, reliability of data transmission may be improved; and the at least two pieces of data may be sent simultaneously, so that an increased latency caused by a plurality of transmissions of the at least two pieces of data in different time units is avoided.

Figure 13:
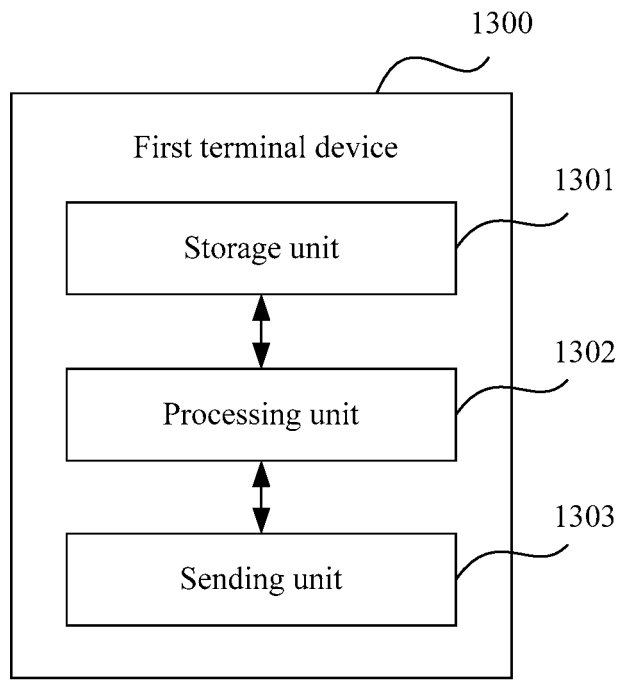
FIG. 13 is a schematic diagram of a possible first terminal device according to the present disclosure.

When an integrated unit is used, FIG. 13 is a possible schematic structural diagram of the first terminal device used in the foregoing embodiments. The first terminal device 1300 includes a processing unit 1302 and a sending unit 1303. The processing unit 1302 is configured to control and manage an action of the first terminal device 1300. For example, the processing unit 1302 is configured to support the first terminal device 1300 in performing S901 in FIG. 9 and/or another process of the technology described in this specification. The sending unit 1303 is configured to support the first terminal device 1300 in communicating with another terminal entity, for example, communicating with a network device and a second terminal device. The first terminal device 1300 may further include a storage unit 1301, configured to store program code and data of the first terminal device 1300.

For example, the processing unit 1302 is configured to determine at least two carriers, where the at least two carriers are used to transmit at least two pieces of data corresponding to a same transport block, and the at least two carriers are in a one-to-one correspondence with the at least two pieces of data.

The processing unit 1302 is further configured to control the sending unit 1303 to perform the following step: sending the at least two pieces of data to the second terminal device or the network device by using the at least two carriers.

The processing unit 1302 may be a processor or a controller, for example, may be a CPU, a general purpose processor, a DSP, an ASIC, an FPGA, or another programmable logic device, a transistor logic device, a hardware component, or any combination thereof. The controller/processor may implement or execute various example logical blocks, modules, and circuits described with reference to content disclosed in the present disclosure. Alternatively, the processor may be a combination of processors implementing a computing function, for example, a combination of one or more microprocessors, or a combination of the DSP and a microprocessor. The sending unit 1303 may be a transceiver, a transceiver circuit, or the like. The storage unit 1301 may be a memory.

Figure 14:
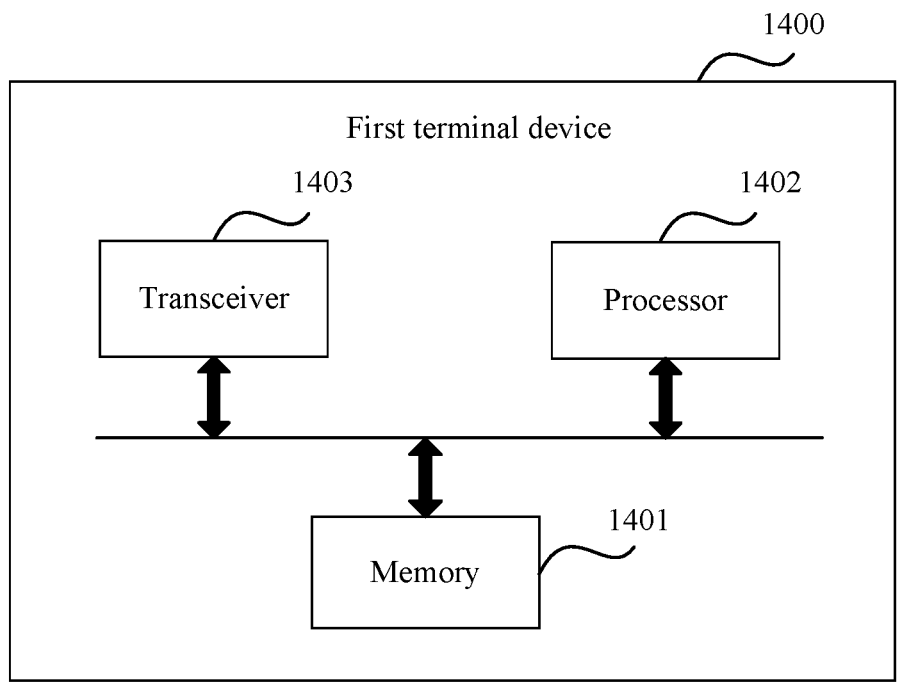
FIG. 14 is a schematic diagram of another possible first terminal device according to the present disclosure.

When the processing unit 1302 is a processor, the sending unit 1303 is a transceiver, and the storage unit 1301 is a memory, the first terminal device used in the present disclosure may be a first terminal device shown in FIG. 14.

As shown in FIG. 14, the first terminal device 1400 includes a processor 1402, a transceiver 1403, and a memory 1401. The transceiver 1403, the processor 1402, and the memory 1401 may communicate with each other by using an internal connection channel, and transmit a control signal and/or a data signal.

A person skilled in the art can clearly understand that for convenience and brevity of description, for specific working processes of the apparatus and units described above, refer to the corresponding processes in the foregoing method embodiments, and no further details are provided herein.

The first terminal device 1300 and the first terminal device 1400 provided in the present disclosure may send at least two pieces of data to a second terminal device or a network device on at least two carriers, where the at least two pieces of data correspond to a same transport block, so as to improve reliability of data transmission; and the at least two pieces of data may be sent simultaneously, so that an increased latency caused by a plurality of transmissions of the at least two pieces of data in different time units is avoided.

Figure 15:
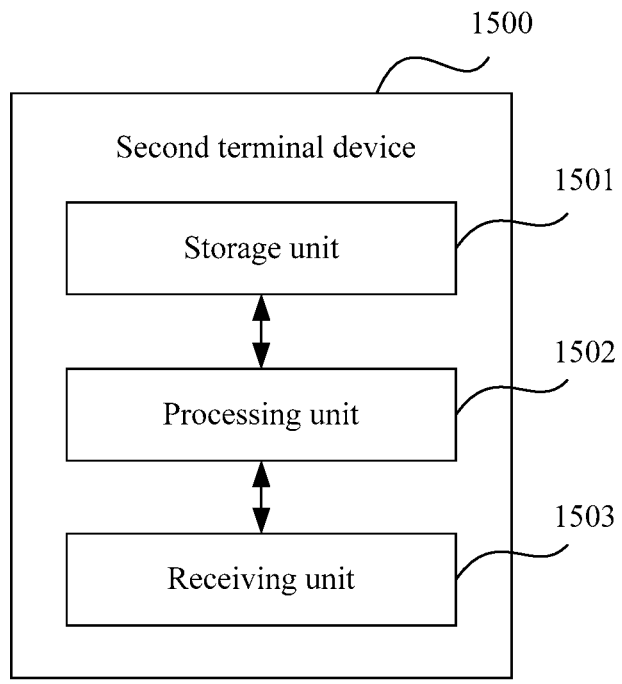
FIG. 15 is a schematic diagram of a possible second terminal device according to the present disclosure.

When an integrated unit is used, FIG. 15 is a possible schematic structural diagram of the second terminal device used in the foregoing embodiments. The second terminal device 1500 includes a processing unit 1502 and a receiving unit 1503. The processing unit 1502 is configured to control and manage an action of the second terminal device 1500. For example, the processing unit 1502 is configured to support the second terminal device 1500 in performing S1001 in FIG. 10 and/or another process of the technology described in this specification. The receiving unit 1503 is configured to support the second terminal device 1500 in communicating with another terminal entity, for example, communicating with a network device and a first terminal device. The second terminal device 1500 may further include a storage unit 1501, configured to store program code and data of the second terminal device 1500.

For example, the processing unit 1502 is configured to control the receiving unit 1503 to perform the following steps:

receiving second information from the first terminal device, where the second information is used to indicate at least two carriers, and the second information is used to indicate that at least two pieces of data corresponding to a same transport block are transmitted on the at least two carriers; and receiving the at least two pieces of data from the first terminal device by using the at least two carriers.

The processing unit 1502 may be a processor or a controller, for example, may be a CPU, a general purpose processor, a DSP, an ASIC, an FPGA, or another programmable logic device, a transistor logic device, a hardware component, or any combination thereof. The controller/processor may implement or execute various example logical blocks, modules, and circuits described with reference to content disclosed in the present disclosure. Alternatively, the processor may be a combination of processors implementing a computing function, for example, a combination of one or more microprocessors, or a combination of the DSP and a microprocessor. The receiving unit 1503 may be a transceiver, a transceiver circuit, or the like. The storage unit 1501 may be a memory.

Figure 16:
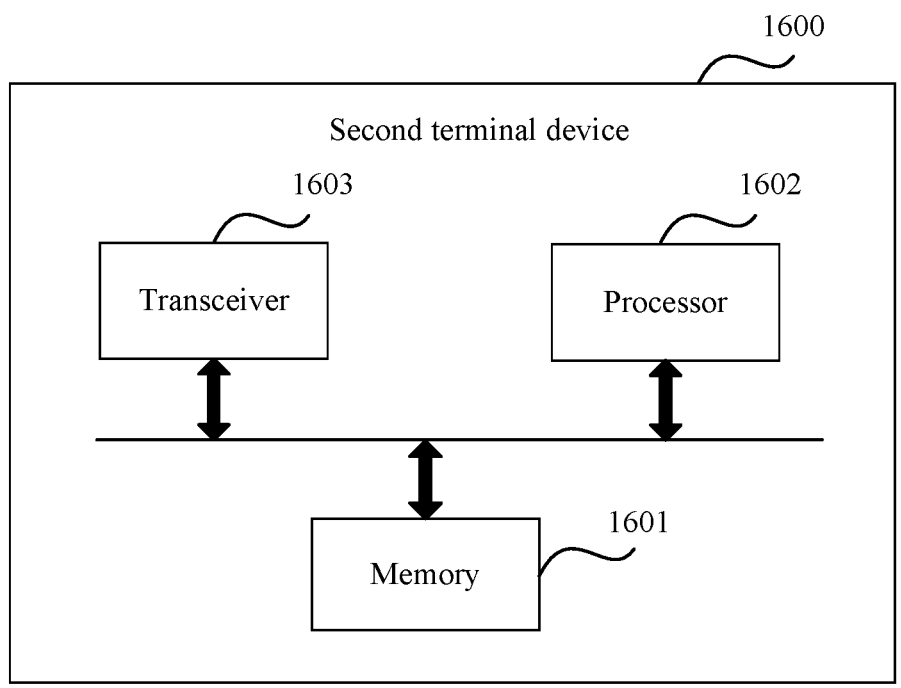
FIG. 16 is a schematic diagram of another possible second terminal device according to the present disclosure.

When the processing unit 1502 is a processor, the receiving unit 1503 is a transceiver, and the storage unit 1501 is a memory, the second terminal device used in the present disclosure may be a second terminal device shown in FIG. 16.

As shown in FIG. 16, the second terminal device 1600 includes a processor 1602, a transceiver 1603, and a memory 1601. The transceiver 1603, the processor 1602, and the memory 1601 may communicate with each other by using an internal connection channel, and transmit a control signal and/or a data signal.

A person skilled in the art can clearly understand that for convenience and brevity of description, for specific working processes of the apparatus and units described above, refer to the corresponding processes in the foregoing method embodiments, and no further details are provided herein.

The second terminal device 1500 and the second terminal device 1600 provided in the present disclosure receive second information from a first terminal device, where the second information indicates that at least two pieces of data corresponding to a same transport block are transmitted on at least two carriers, and receive the at least two pieces of data from the first terminal device on the at least two carriers, so as to improve reliability of data transmission; and the at least two pieces of data may be sent simultaneously, so that an increased latency caused by a plurality of transmissions of the at least two pieces of data in different time units is avoided.

It should be understood that the transceiver may include a transmitter and a receiver. The transceiver may further include an antenna. There may be one or more antennas. The memory may be an independent device, or may be integrated into the processor. All or some of the foregoing devices may be integrated into a chip for implementation, for example, integrated into a baseband chip for implementation.

The network device or the terminal device in the apparatus embodiments fully corresponds to the network device or the terminal device in the method embodiments. A corresponding module performs a corresponding step. For example, a sending module or a transmitter performs a sending step in the method embodiments, and a receiving module or a receiver performs a receiving step in the method embodiments. Steps other than the sending and receiving steps may be performed by a processing module or a processor. For a function of a specific module, refer to a corresponding method embodiment. Details are not described again.

It should be understood that sequence numbers of the foregoing processes do not mean execution sequences in various embodiments of the present disclosure. The execution sequences of the processes should be determined based on functions and internal logic of the processes, and should not be construed as any limitation on the implementation processes of the present disclosure.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Method or algorithm steps described in combination with the content disclosed in the present disclosure may be implemented by hardware, or may be implemented by a processor by executing a software instruction. The software instruction may include a corresponding software module. The software module may be stored in a random access memory (random access memory, RAM), a flash memory, a read-only memory (read-only memory, ROM), an erasable programmable read-only memory (erasable programmable ROM, EPROM), an electrically erasable programmable read-only memory (electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a terminal device. Certainly, the processor and the storage medium may exist in a terminal device or a network device as discrete components.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the present disclosure are all or partially generated. The computer may be a general-purpose computer, a dedicated computer, a computer network, or other programmable apparatuses. The computer instruction may be stored in a computer readable storage medium, or may be transmitted by using the computer readable storage medium. The computer instructions may be transmitted from one website site, computer, server or data center to another website site, computer, server, or data center in a wired (for example, coaxial cable, optical fiber, or digital subscriber line (digital subscriber line, DSL)) or a wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (digital versatile disc, DVD), a semiconductor medium (for example, a solid-state drive (solid state disk, SSD)), or the like.

The objectives, technical solutions, and benefits of the present disclosure are further described in detail in the foregoing embodiments. It should be understood that the foregoing descriptions are merely embodiments of the present disclosure, but are not intended to limit the protection scope of the present disclosure. Any modification, equivalent replacement or improvement made within the spirit and principle of various embodiment(s) of the invention shall fall within the protection scope of the present disclosure.

What is claimed is:

1. A data sending method, comprising:
    determining, by a first terminal device, at least two carriers, wherein the at least two carriers facilitates transmitting at least two pieces of data corresponding to a same transport block, and the at least two carriers are in a one-to-one correspondence with the at least two pieces of data;
    wherein the determining the at least two carriers comprises:
        receiving, by the first terminal device, first information from a network device, wherein the first information indicates the at least two carriers, and the first information indicates that the at least two pieces of data corresponding to the same transport block are transmitted on the at least two carriers;
        determining, by the first terminal device, the at least two carriers based on the first information; and
    sending, by the first terminal device, the at least two pieces of data to a second terminal device or the network device by using the at least two carriers.

2. The method according to claim 1, wherein the first information comprises at least two pieces of first identification information, the at least two pieces of first identification information indicating the at least two carriers.

3. The method according to claim 1, wherein the first information comprises at least two pieces of indication information, any one of the at least two pieces of indication information comprises first identification information and second identification information, the first identification information indicating one of the at least two carriers, the second identification information in the at least two pieces of indication information indicating one of the at least two carriers, and the second identification information indicating that the at least two pieces of data corresponding to the same transport block are transmitted on the at least two carriers.

4. The method according to claim 3, wherein before receiving, by the first terminal device, the first information from the network device, the method further comprises:
receiving, by the first terminal device, first configuration information and second configuration information from the network device, wherein the first configuration information facilitates configuring identification information of the at least two carriers as the first identification information, and the second configuration information facilitates configuring time-frequency resource pools corresponding to the at least two carriers.

5. The method according to claim 3, wherein before receiving, by the first terminal device, the first information from the network device, the method further comprises:
receiving, by the first terminal device, second configuration information and third configuration information from the network device, wherein the second configuration information facilitates configuring time-frequency resource pools corresponding to the at least two carriers, and the third configuration information facilitates configuring an association relationship, the association relationship indicating that the at least two pieces of data corresponding to the same transport block are transmitted on the at least two carriers.

6. The method according to claim 1, wherein the method further comprises:
sending, by the first terminal device, second information to the second terminal device, wherein the second information indicates that the at least two pieces of data corresponding to the same transport block are transmitted on the at least two carriers.

7. The method according to claim 6, wherein sending, by the first terminal device, the second information to the second terminal device comprises:
sending, by the first terminal device, the second information to the second terminal device by using a first carrier, wherein the first carrier is one of the at least two carriers, and the second information comprises at least first identification information, the first identification information is indicating a second carrier, the second carrier being at least one carrier in the at least two carriers other than the first carrier.

8. A data receiving method, comprising:
receiving, by a second terminal device, first configuration information and second configuration information from a network device, wherein the first configuration information facilitates configuring identification information of at least two carriers as first identification information, and the second configuration information facilitates configuring time-frequency resource pools corresponding to the at least two carries;
receiving, by the second terminal device, information from a first terminal device by using a first carrier, wherein the information comprises at least two pieces of the first identification information, and the at least two pieces of the first identification information indicate the at least two carriers, wherein the second information indicates a second carrier, the first carrier is one of the at least two carriers, the second carrier is at least one carrier in the at least two carriers other than the first carrier, and the information indicates that at least two pieces of data corresponding to a same transport block are transmitted on the at least two carriers; and
receiving, by the second terminal device, the at least two pieces of data from the first terminal device by using the at least two carriers.

9. The method according to claim 8, wherein before receiving, by the second terminal device, the information from the first terminal device, the method further comprises:
receiving, by the second terminal device, the second configuration information and third configuration information from the network device, wherein the second configuration information facilitates configuring time-frequency resource pools corresponding to the at least two carriers, the third configuration information facilitates configuring an association relationship, and the association relationship is used to indicate that the at least two pieces of data corresponding to the same transport block are transmitted on the at least two carriers.

10. A data sending method, comprising:
determining, by a first terminal device, at least two carriers, wherein the at least two carriers facilitates transmitting at least two pieces of data corresponding to a same transport block, and the at least two carriers are in a one-to-one correspondence with the at least two pieces of data;
sending, by the first terminal device, the at least two pieces of data to a second terminal device or a network device by using the at least two carriers; and
sending, by the first terminal device, first information to the second terminal device, wherein the first information indicates that the at least two pieces of data corresponding to the same transport block are transmitted on the at least two carriers.

11. The method according to claim 10, wherein determining, by the first terminal device, the at least two carriers comprises:
receiving, by the first terminal device, second information from the network device, wherein the second information indicates the at least two carriers, and the second information indicates that the at least two pieces of data corresponding to the same transport block are transmitted on the at least two carriers; and
determining, by the first terminal device, the at least two carriers based on the second information.

12. The method according to claim 11, wherein the second information comprises at least two pieces of first identification information, the at least two pieces of first identification information indicating the at least two carriers.

13. The method according to claim 11, wherein the second information comprises at least two pieces of indication information, any one of the at least two pieces of indication information comprises first identification information and second identification information, the first identification information indicating one of the at least two carriers, the second identification information in the at least two pieces of indication information indicating one of the at least two carriers, and the second identification information indicating that the at least two pieces of data corresponding to the same transport block are transmitted on the at least two carriers.

14. The method according to claim 13, wherein before receiving, by the first terminal device, the second information from the network device, the method further comprises:
receiving, by the first terminal device, first configuration information and second configuration information from the network device, wherein the first configuration information facilitates configuring identification information of the at least two carriers as the first identification information, and the second configuration information facilitates configuring time-frequency resource pools corresponding to the at least two carriers.

15. The method according to claim 13, wherein before receiving, by the first terminal device, the second information from the network device, the method further comprises:
receiving, by the first terminal device, second configuration information and third configuration information from the network device, wherein the second configuration information facilitates configuring time-frequency resource pools corresponding to the at least two carriers, and the third configuration information facilitates configuring an association relationship, the association relationship indicating that the at least two pieces of data corresponding to the same transport block are transmitted on the at least two carriers.

16. The method according to claim 10, wherein sending, by the first terminal device, the first information to the second terminal device comprises:
sending, by the first terminal device, the first information to the second terminal device by using a first carrier, wherein the first carrier is one of the at least two carriers, and the first information comprises at least first identification information, the first identification information is indicating a second carrier, the second carrier being at least one carrier in the at least two carriers other than the first carrier.

* * * * *